United States Patent
Tal-Botzer et al.

(10) Patent No.: US 11,978,130 B2
(45) Date of Patent: *May 7, 2024

(54) SEMI-AUTOMATED SYSTEM AND METHOD FOR ASSESSMENT OF RESPONSES

(71) Applicant: SENSE EDUCATION ISRAEL, LTD., Tel Aviv (IL)

(72) Inventors: Ronen Tal-Botzer, Tel Aviv (IL); Lior Strauss, Ganei Modi'in (IL); Netanel Ghatan, Tel Aviv-Jaffa (IL)

(73) Assignee: SENSE EDUCATION ISRAEL, LTD., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/739,516

(22) Filed: May 9, 2022

(65) Prior Publication Data
US 2022/0261937 A1    Aug. 18, 2022

Related U.S. Application Data

(63) Continuation of application No. 16/840,736, filed on Apr. 6, 2020, now Pat. No. 11,328,377, which is a continuation of application No. 15/549,179, filed as application No. PCT/IB2016/050637 on Feb. 8, 2016, now Pat. No. 10,614,536.

(60) Provisional application No. 62/112,665, filed on Feb. 6, 2015.

(51) Int. Cl.
*G07B 7/00* (2006.01)
*G06F 18/23* (2023.01)
*G06F 18/40* (2023.01)
*G06Q 50/20* (2012.01)
*G09B 7/00* (2006.01)
*G09B 7/02* (2006.01)

(52) U.S. Cl.
CPC ............. *G06Q 50/20* (2013.01); *G06F 18/23* (2023.01); *G06F 18/40* (2023.01); *G09B 7/00* (2013.01); *G09B 7/02* (2013.01)

(58) Field of Classification Search
CPC ........ G09B 7/02; G09B 7/00; G09B 19/0053; G06K 9/6218; G06K 9/6253
See application file for complete search history.

(56) References Cited

U.S. PATENT DOCUMENTS

2002/0142277 A1* 10/2002 Burstein .................. G09B 7/02
434/335
2013/0302775 A1* 11/2013 King ........................ G09B 7/00
434/362

* cited by examiner

*Primary Examiner* — Omkar A Deodhar
(74) *Attorney, Agent, or Firm* — DALY, CROWLEY, MOFFORD & DURKEE, LLP

(57) ABSTRACT

Embodiments of the invention provide a semi-automated system and method for assessment of student work product. The method may comprise obtaining a plurality of student work product from a plurality of students, identifying motifs present in the student work product, forming a subset of motifs, clustering the work product into clusters based on the subset of motifs, receiving an assessment from a teacher relevant to clusters and providing assessment for a work product based on the cluster assessment. Methods according to embodiments of the invention may reduce teachers' review and feedback time and increase consistency and quality of feedback given to students.

20 Claims, 4 Drawing Sheets

SEMI-AUTOMATED SYSTEM AND METHOD FOR ASSESSMENT OF RESPONSES

RELATED APPLICATIONS

The present application is a continuation of U.S. patent application Ser. No. 16/840,736 filed on Apr. 6, 2020, which is a continuation of U.S. patent application Ser. No. 15/549,179 filed on Aug. 7, 2017, which is a National Stage Entry of International Patent Application No. PCT/IB16/50637 filed on Feb. 8, 2016, which claims the benefit of U.S. Provisional Patent Application No. 62/112,665 filed on Feb. 6, 2015, the disclosures of which are incorporated herein by reference.

TECHNICAL FIELD

Embodiments of the invention relate to methods and systems for assessment of academic works.

BACKGROUND

In many scholastic and academic environments, teachers (including lecturers, educators, trainers, teachers assistants and professors, all hereinafter collectively referred to as "teachers") prepare assignments, reports, projects, homework and tests (collectively "student work product") in order to gauge and advance student learning. In many fields, teachers use open-ended questions in which students may answer in free-text format, mathematical format, programming code format or in similar forms. In order to review, grade and provide valuable feedback to the student, teachers spend large amounts of time reading, reviewing and commenting on the students' answers to the assignment or tests, in order to assist the students' learning processes. Reviewing of student work product may be particularly burdensome in large classrooms in universities, colleges, high schools, professional schools, corporate training and in online teaching environments.

In order to save time reviewing students' answers, teachers may prepare multiple choice tests that can be easily checked manually or using a computer. However, multiple choice tests have many disadvantages. In many fields, the multiple choice format cannot accurately capture students' methods of obtaining the answer. Answers to multiple choice questions are also easier for students to copy or cheat from their peers. In addition, many multiple choice questions are required to properly assess a student's proficiency in a given subject.

SUMMARY

In an academic or scholastic environment in which assignments are presented to a large number of students, many of the students' work products may be similar to that of other students. Student work product may be divided into a number of clusters, each cluster comprising student work from multiple students, allowing a teacher to provide feedback relative to each cluster without the need to assess each student's work.

Embodiments of the invention provide a semi-automated system and method for assessment of student work product. The method may comprise obtaining a plurality of student work product from a plurality of students, identifying motifs present in the work product, selecting a subset of motifs in the work product, clustering the work product into clusters, receiving an assessment from a teacher relevant to clusters and providing assessment for a work product based on the cluster assessment.

Selecting a subset of motifs in the work product may be performed using a processor of a computing device to find a subset of motifs providing optimal coverage of student work product with minimal overlap of student work product.

Clustering may be performed using a computing device, comprising non-transient memory, configured to perform an algorithm. Methods according to embodiments of the invention may reduce teachers' review and feedback time and increase consistency and quality of feedback given to students.

According to an embodiment of the invention, after using the system and/or method for clustering and receiving teacher assessment relative to a certain work product, a teacher may store the clustering and assessment data in a database and use the clustering and assessment data for assessing a similar work product from students, thereby reducing the time required to provide feedback to the students. For example, if the teacher uses the aforementioned method for assistance in assessing students' work product for a given assignment and stores the resulting clustering and assessment data in a database, the teacher may, using a computing device, classify the newly received work product, based on the clustering, classification and/or assessment given to a prior assignment. This classification may assist a teacher giving the same assignment to a different group of students in a similar course or in a subsequent term, and allow for easy, rapid review of student response.

Methods according to embodiments of the invention may save teachers time in providing personalized student feedback on student work product without reviewing every work product from every student on an individual basis.

Although this summary addresses academic works and their assessment by teachers, embodiments of the invention may relate to systems and methods for assessment of responses to any types of questions. For example, a survey may be performed in which users of a product are asked to describe their user experience. The responses submitted by the users may be analyzed by a reviewer and clustered using the methods described herein. The methods may simplify the analysis process pertained by a reviewer.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF FIGURES

Non-limiting examples of embodiments are described below with reference to figures attached hereto that are listed following this paragraph. Identical structures, elements or parts that appear in more than one figure are generally labeled with a same numeral in all the figures in which they appear, and a numeral labeling an icon representing a given feature in a figure may be used to reference the given feature. Dimensions of components and features shown in the figures are chosen for convenience and clarity of presentation and are not necessarily shown to scale.

DETAILED DESCRIPTION

Figure 1:
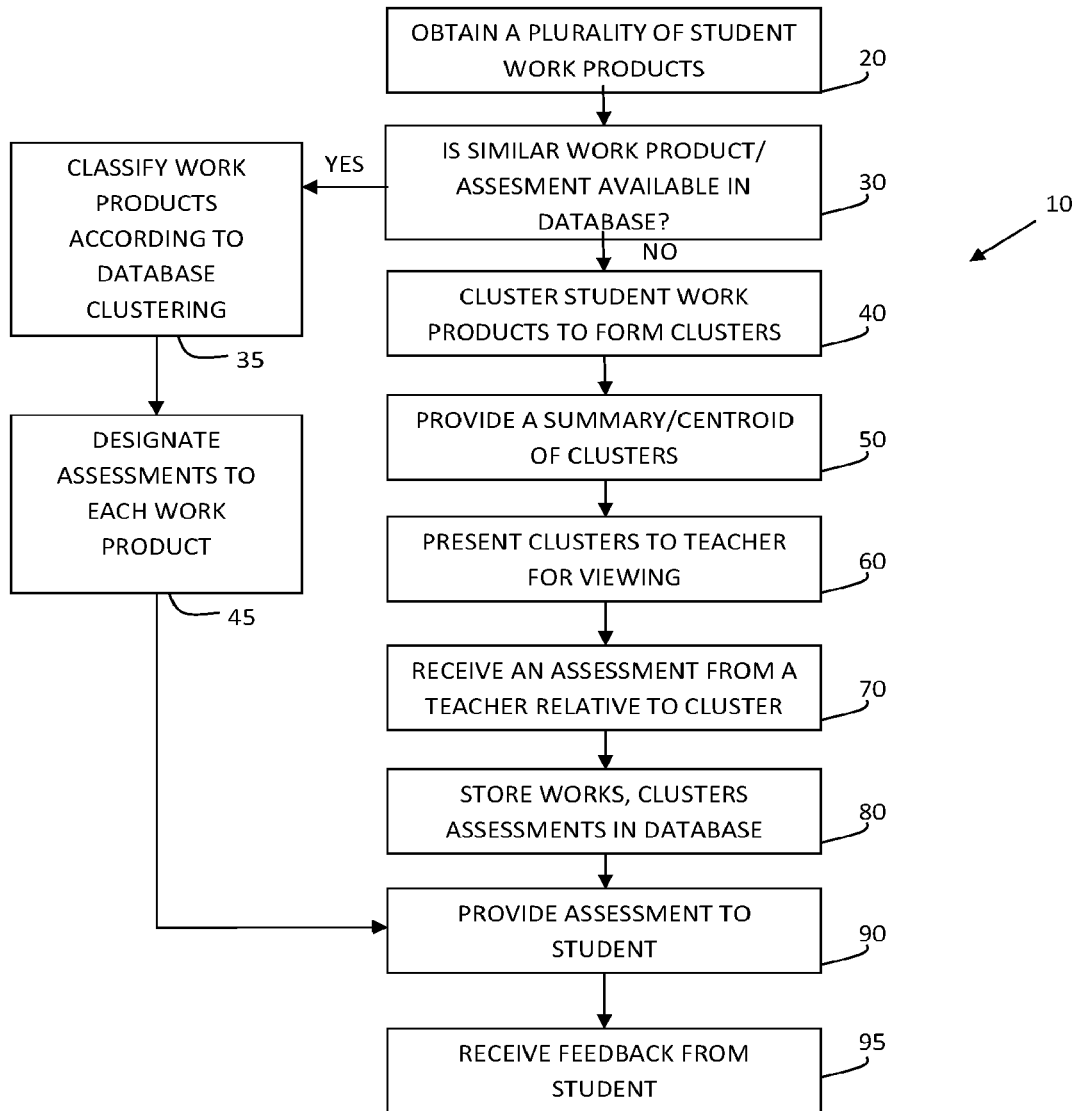
FIG. 1 depicts a block diagram showing a method for assessing student work product according to embodiments of the invention.

Reference is now made to FIG. 1, depicting a block diagram showing a method 10 for assessing student work product according to embodiments of the invention.

Method 10 comprises block 20, comprising obtaining a plurality of student work products. The work product may be submitted to a computing device. According to an embodiment of the invention, a computing device may be server, a smartphone, a desktop computer, a laptop computer, a phablet, a tablet or a smartwatch. Optionally, a computer device or server may be a "distributed system" with code and hardware components located in different, physically distinct locations. The computing device may be a "cloud computer" or may be a part of the World Wide Web or Internet. According to an embodiment of the invention, data communication to and from the computing device may be through wired and/or wireless communication, cellular data transmission, Wi-Fi network, cloud-computing, or through the World Wide Web or Internet.

According to an embodiment of the invention, the computing device may be associated with an academic institution's Learning Management System (LMS). LMS are currently instituted by many academic institutions. Exemplary LMSs which may be used for implementation of embodiments of the invention include "Moodle" and "Blackboard."

According to embodiments of the invention, the computing device comprises a processor. Processor 41 may comprise any processing and/or control circuitry known in the art and may by way of example comprise any one or any combination of more than one of a microprocessor, an application specific circuit (ASIC), field programmable array (FPGA) and/or system on a chip (SOC). A processor may perform generation of a motif bank, processing of the motif bank and clustering.

According to an embodiment of the invention, the computing device comprises a memory. The memory may have any electronic and/or optical circuitry suitable for storing data and/or computer executable instructions and may, by way of example, comprise any one or any combination of more than one of a flash memory, random access memory (RAM), read only memory (ROM), and/or erasable programmable read-only memory (EPROM). Student work may be stored in memory. Motif data and/or clustering data may be stored in the memory.

According to an embodiment of the invention, student work products may be obtained, for example, by a teacher and/or a student submission to a computing device. Students and/or teachers may submit student work product using a web-based platform. Students and/or teachers may enter the web-based platform after entering a personal identification code or number or other identifier.

According to an embodiment of the invention, the teacher is a faculty member including a teacher's assistant, in a scholastic, academic, public, private or vocational institution. The institution may offer classes in person, for example in a classroom, or on-line teaching.

According to an embodiment of the invention, the student work product is selected from the group consisting of: answers to assignments, reports, projects, homework answers and test answers.

According to an embodiment of the invention, each student submits a single work product, for example, a single assignment. According to an embodiment of the invention, each student submits multiple work products, for example, an assignment having multiple, distinct answers. Methods according to embodiments of the invention may cluster each answer independently of other answers in the assignment.

Method 10 comprises block 30 comprising determining if assessments relevant to similar work products are available in a database. Similar work products may have been previously submitted, for example by the same teacher in a previous semester, or by another teacher teaching the same course. The database may be stored in a memory of a computing device.

A computing device, according to embodiments of the invention, may automatically match students' works of a certain course/class, given by a certain teacher at a certain time, to already-stored works of a different course/class, even if the two teachers are not aware of each other's courses. The matching process may be performed by classifying work product received relative to sets of work product stored in the database. A match may be defined if the average scores of classifying the new work product relative stored work product and their associated clusters is higher than a predefined threshold or threshold formula.

If no assessments relevant to work product are identified, method 10 may further comprise block 40, comprising clustering student work product to form clusters. Clustering will be addressed below at greater length, with reference to FIG. 2.

Method 10 may further comprise block 50, comprising providing a summary and/or centroid work product relative to clusters. A centroid work product is a work product associated with a centroid of a cluster. The centroid may be a work product that is most similar to the other work products in the cluster. Summary and centroid work product will be addressed in further detail below, with reference to FIG. 2.

Method 10 may further comprise block 60, comprising presenting clusters to teacher for viewing. According to an embodiment of the invention, a summary of work products of a cluster, representative of the cluster, is presented to the teacher. According to an embodiment of the invention, a centroid work product representative of the cluster is presented to the teacher. According to an embodiment of the invention, both a summary and a centroid work product representative of the cluster is presented to the teacher.

According to an embodiment of the invention, a summary may comprise statistical data relevant to the work product, motifs and/or clusters. A summary may comprise statistical data describing frequency of motifs in overall student work product and/or in each cluster. The summary may then be used by a teacher to analyze student understanding in order to improve future pedagogic methods, for example, to focus more attention in classroom time to motifs which were poorly understood.

Figure 3:
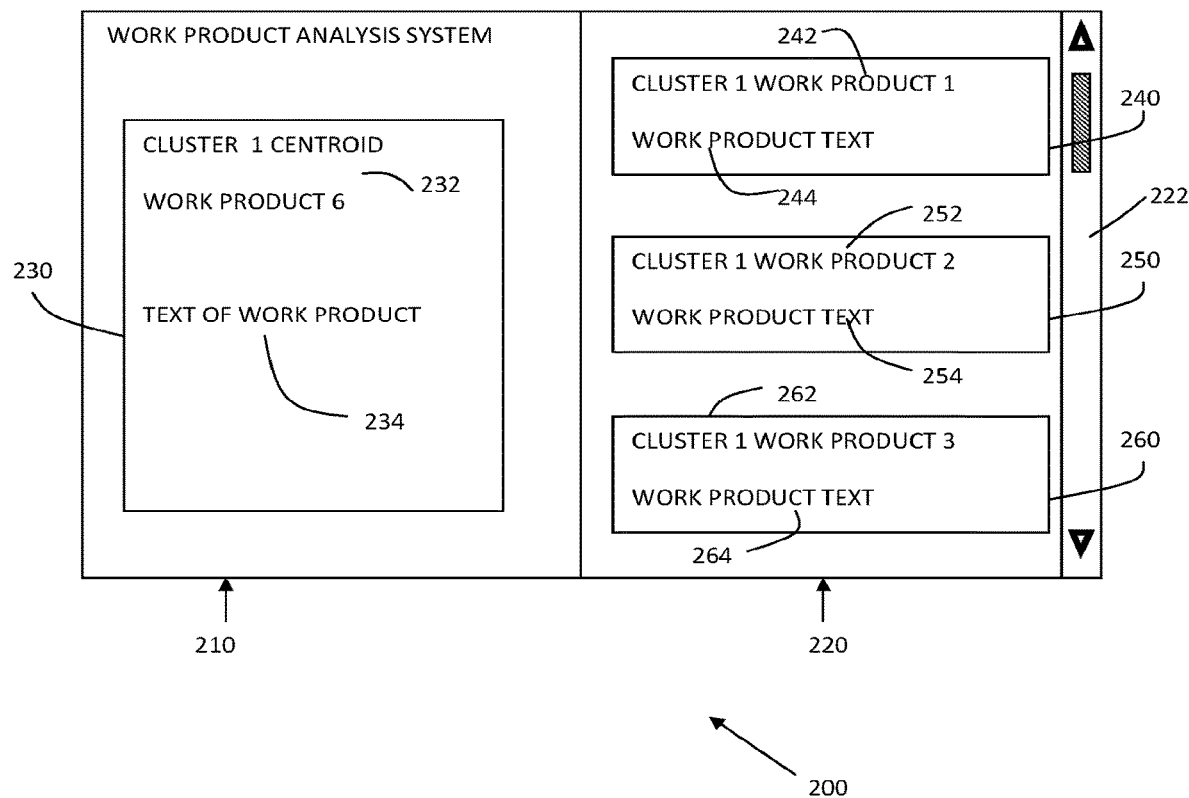
FIG. 3 depicts a wireframe of a display of clustered results according to embodiments of the invention.

Reference is now made to FIG. 3 comprising a wireframe 200 of a display of a computing device showing clustered work products, according to an embodiment of the invention. Presentation of work product to a teacher may be performed as shown in wireframe 200. Wireframe 200 comprises a left frame 210, a right frame 220 and a scroll bar 222. Left frame 210 comprises a centroid display 230, showing a centroid work product of a given cluster. Centroid display 230 comprises a centroid title 232 and a centroid text 234. For example, centroid display 230 may display a centroid work product of a cluster designated "cluster 1," the centroid work product being designated "work product 6" of the cluster.

Right frame 220 comprises multiple work products 240, 250 and 260, each designated within the same cluster, for example, work products associated with "cluster 1". Work product 240 comprises a work product title 242 and a work product text 244. Work product 250 comprises a work product title 252 and a work product text 254. Work product 260 comprises a work product title 262 and a work product text 264.

Viewing student work product using a display as schematically shown in wireframe 200 may be advantageous to a teacher reviewing the work products in a given cluster. The display may give the teacher an ability to easily compare the centroid work product of a cluster and other work products of the cluster. The teacher may scroll right frame 220, using scroll bar 222, thereby displaying all of the work products within a cluster.

According to an embodiment of the invention, wireframe 200 may comprise a cluster verification and/or cluster removal icon (both not shown) associated with a work product. A teacher may view a work product, for example in right frame 220, and confirm by activating the cluster verification icon that the associated work product should be associated with the current cluster being viewed. A teacher may indicate, by activating the cluster removal icon that the associated work product should not be associated with the current cluster being viewed. The teacher may indicate to which cluster the work product should be associated. The system may use the input from the teacher to cluster the work product in a different cluster. As a result of the teacher's input, the system may also change the assignments of additional very similar works from that cluster to another cluster.

According to an embodiment of the invention, work product text 244, 254 and 264 may each comprise highlighted text or text otherwise distinguished from other text, for example by font size or style. The highlighted text may comprise motifs identified to be characteristic of the cluster to which work products 240, 250 and 260 are associated. The highlighted text or text otherwise distinguished from other text may comprise motif data relating to the work product text.

Reference is made, once again to FIG. 1, method 10, further comprising block 70, comprising receiving an assessment from a teacher relative to a cluster.

The assessment received from a teacher may comprise any one or a plurality of: a grade of the work product, feedback regarding the student work product, a suggestion of a future assignment for the author of the student work product, or a suggestion of directed study. A suggestion of directed study may comprise a matching between a student in a certain cluster to study and/or collaborate with a student or plurality of students from another cluster.

Method 10 may further comprise block 80 comprising storing work product, associated clustering data and assessment in a database. Assessments associated with clusters may be stored in a database for future reference, for example, if a teacher provides the same or a similar assignment in another class or a subsequent semester, a teacher may access the previously stored clustering and assessment data.

Method 10 may further comprise block 90 comprising providing an assessment of the student's work product to a student. According to an embodiment of the invention, the assessment may be sent electronically, for example, via email or via the institution's Learning Management System (LMS). According to an embodiment of the invention, the assessment may be sent automatically by a computer to the student upon receipt of assessment from a teacher relative to a cluster according to block 70.

According to an embodiment of the invention, a student may be provided with an assessment of his/her own student work product. Optionally, the student may also be given access to assessments provided by the teacher relative to other clusters of student work product.

Reference is made, once again to block 30. If an assessment relevant to work product is identified in a database, method 10 may further comprise block 35, comprising classifying student work product according to a previously designated cluster. Each student work product may be analyzed and classified according to a previously formed cluster, based on a feature or features present in student work product.

According to an embodiment of the invention, a student may be asked to resubmit work product related to an assignment. In such a situation, the work product may be classified according to block 35, providing the student with new assessment and feedback relevant to his/her resubmitted work product.

Method 10 may further comprise block 45, comprising designating assessments to each cluster of work product. Assessments may be designated based on teacher input, or based on prior assessments stored in the database relevant to corresponding clusters having similar features.

Upon designated assessments to each cluster of work product, the assessments may be provided to each student, as described in block 90.

Method 10 may further comprise block 95, comprising receiving feedback from students relating to the assessment received by the student. The student may submit feedback to a teacher relating to the assessment. Feedback may relate to clustering and/or relevance of assessment. Teacher may modify clustering and/or assessment associated with each cluster based on the feedback received, and/or statistical aggregation and analysis of all feedbacks. Optionally, an optimization algorithm may be used to incorporate student feedback, thereby improving future clustering and/or feedback.

Figure 2:
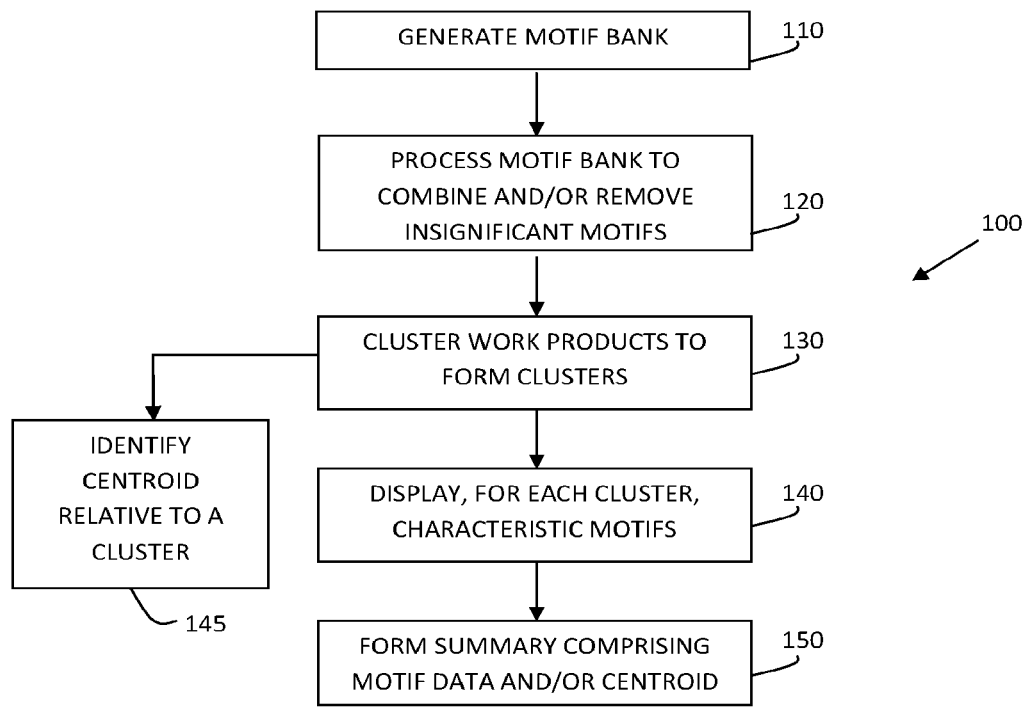
FIG. 2 depicts a block diagram showing aspects of a method for clustering and assessing student work product according to embodiments of the invention.

Reference is now made to FIG. 2, depicting a block diagram showing a method 100 showing aspects of a method for clustering and assessing student work product according to embodiments of the invention. Method 100 may be performed by a computing device.

Method 100 may comprise block 110, comprising generating a motif bank based on received student work product. Motifs may be elements (for example, sub-patterns) common among student work product. For example, in a computer science assignment to sort an array of random number, a motif could be a loop that scans all the values in the array in order to find the minimal value. Many of students' works, which could be different from each other, may include this motif. An alternative motif could be a loop that scans all adjacent pairs of values in the array in order to sort just the pair of values in each pair.

According to an embodiment of the invention, a motif is identified by comparing a student work product to multiple other student work products. A student's solution may be "cut" into various sections, or motifs, based on recurrent presence of same or similar sections appearing in other student works.

According to an embodiment of the invention, a motif is formed using a segmentation algorithm. The segmentation algorithm may be similar to a text segmentation algorithm used to identify phrases or sentences in a text.

According to an embodiment of the invention, motifs may be generated from student work product using a sequence alignment algorithm. In sequence alignment, elements of a student work product (words, numbers, sections of code, concepts or the like) may be analyzed using "global sequence alignment" and/or "local sequence alignment." Dynamic programming approaches may be used to perform sequence alignment to student work product. Other sequence alignment approaches could include the algorithms implemented in the field of bioinformatics, genome sciences, text mining and natural language processing.

According to an embodiment of the invention, motifs are found by assigning a pair to each work product, and using local alignment to compare the work product. Optionally, a random selection of pairs may be made. Optionally, every work product may be compared to every other work product. Local alignment may be performed, optionally using dynamic programming, in the following fashion, to find local alignment between sub-sequences in a pair of works. For example, if one work is ABCDEFGHUK and the other is ZZZZZZBCZDEGZZ, then the BCDEFG sub-sequence from the first work will be matched with the BCZDEG sub-sequence of the second work. Although these two sub-sequences are not identical, as there are insertion, deletion and replacement changes (mutations) between the two sub-sequences, nevertheless, the similarity may still be recognized as a common motif Although in one work the sub-sequence is at the beginning of the sequence and in the other work it is at the end of the sequence, these will still be considered a motif due to use of local alignment algorithm. Upon recognition of the sub-sequences as a motif, they may be added to a motif bank. The computing device may continue to analyze the same pair of works to find another motif that appears in both works. The computing device may continue to analyze subsequent pairs of works and repeat the same procedure as above.

According to an embodiment of the invention, motifs may be identified based on similarity of features common to a student work product and other student work products. This may be referred to as feature-based motif identification. Exemplary features which may be used for feature-based motif identification include the non-limiting examples: how many words are in the work product, how many nouns, how many verbs, how many/which names of persons, places, dates, events, countries, companies, genes, diseases, molecular compounds, physical laws, mathematical theorems, political movements, religious views, complexity of the work product, size of the work product, which nouns/verbs/proper nouns are used, and the like. A library of such entities could be obtained from digital sources and the World Wide Web in general, with or without using a keyword extraction algorithm.

According to an embodiment of the invention, motifs may be generated using a reference-matching algorithm. The teacher may choose a relevant reference to be used for motif generation. Each student work product may be segmented into motifs based on similarity of the student work product or parts thereof to the relevant reference. The reference may be an answer to the question or several such answers, text previously studied in the course, a textbook text or encyclopedic reference. Student work products are then compared to each other based on their respective similarity to the reference.

Method 100 may further comprise block 120, comprising processing the motif bank. The motif bank may be processed to combine motifs and/or to remove insignificant motifs. The motif bank may be processed using a sequence alignment algorithm. The motif bank may be processed to provide an optimum of maximum coverage with minimum overlap of student work product by motifs.

According to an embodiment of the invention, once motifs are found, a matrix may be formed to select a subset of motifs which provide maximal coverage and minimum overlap of the collective work product. The matrix may be formed so that each element (line, word, command or sentence) in each student work product is attributed a line. Motifs present in the work products and stored in the motif bank may each be attributed a column in the matrix. Presence or absence of a motif in a given work product may be may be detected by local alignment between the motif from the bank and the work product, and may indicated by a 1 or 0 respectively, in the appropriate line of the matrix. For each line in the matrix, the sum of elements of the matrix (1 or 0) may be calculated for a given subset of motifs to form a "coverage vector". The processor of the computing device may select a subset of motifs from the motif bank, based on motifs which will provide a "coverage vector" as close as possible to 1, 1, 1_1. Such a subset of motifs provides maximum coverage of work product, with minimal overlap of student work product by motifs. No coverage may be presented as a scalar of 0. Overlap may be presented as values of higher than one. Example 2 below addresses embodiments relating to such a matrix and vector.

According to an embodiment of the invention, motifs which have minimal significance are removed. For example, if a motif was found not to be in a subset that provides maximum coverage with minimal overlap of student work product, the motif may be removed. Optionally, if a motif was found in only a small percentage of the student works below a predetermined threshold, the motif may be discounted and not further processed, or used for clustering.

Method 100 may further comprise block 130, comprising clustering work products to form clusters. Based on subsets of motifs processed according to block 120, a number of clusters, fewer than the number of student work products, are formed. Each cluster may comprise a number of work products, similar to each other based on presence, order, number and/or alignment quality of motifs within each work product. According to an embodiment of the invention, student work products may be clustered into between about 5 and about 20 clusters. Each cluster may be defined by the presence of a certain motif or motifs (for example, the most common motif) in the work products which make up each cluster.

According to an embodiment of the invention, hierarchical or partitional clustering is used to form clusters. Other methods which may be used include: Neighbor-Joining, K-Means, Gaussian Mixture Models, Expectation Maximization, Self-Organizing Maps, Principle Component Analysis, Genetic Algorithms, Neural Networks and other methods known in the fields of unsupervised or supervised learning, bioinformatics, genome sciences, text mining and natural language processing.

According to an embodiment of the invention, a student work product may be clustered, at the same time, in a number of clusters. In other words, the work product may comprise elements which associate it to two or more clusters. According to an embodiment of the invention, the student work product associated with two or more clusters may receive teacher feedback relative to both clusters.

According to an embodiment of the invention, a work product may be determined to be different than work products associated with all other clusters. The work product may be considered to not belong to any cluster and may be presented to the teacher as an individual work product. The work product may receive an individual assessment from the teacher. According to an embodiment of the invention, all work products which are determined to be different and not associated to any cluster may then be presented to the teacher to be evaluated individually.

In order to illustrate an example of clustering, in a computer science assignment to sort an array of random numbers, a motif common in all student work products in one cluster could be a loop that scans all the values in the array in order to find the minimal value. Many of students' works, which may be different from each other, may include this motif. An alternative cluster may comprise all student work products which comprise the motif of a loop that scans all adjacent pairs of values in the array in order to sort just the pair of values in each pair. A third cluster may comprise all student work products which comprise both motifs.

In addition to clustering using a computing device described in relation to block 130, clustering may be improved by human input. A teacher, upon reviewing work products associated with a cluster, may determine that the work product should be categorized in another cluster. The teacher may designate association of the work product with another cluster. The computing device may then recalculate the clustering process to associate other work products in various clusters, in accordance with the teacher's input. For example, the processor, upon such input from a teacher, may recluster those student works which have the same combination of motifs as the one which was designated by the teacher.

Method 100 may further comprise block 140, comprising displaying, for each cluster, at least one characteristic motif. The characteristic motifs may be displayed in a graphical format. The graphical format may show the location of each characteristic motif for each cluster is displayed in relation to its location in each work product. The work products for each cluster may displayed showing a graphical representation of multiple work products, each work product having a motif or multiple motifs represented graphically.

Method 100 may further comprise block 145, comprising identifying a centroid work product, or a plurality of centroid work products, relative to a cluster. The centroid work product may represent a student work product most representative of the student work products of the cluster. A centroid of a cluster may be defined as the work product whose similarity to the other work products in the same cluster is minimal. Other methods to define the centroid could include other metrics, such as Median, Humming Distance, Euclidean Distance, Pearson Correlation and more.

Method 100 may further comprise block 150, comprising forming a summary relevant to a cluster. The summary may comprise a description of motifs relevant to each cluster and or metrics relevant to each cluster. For example, the summary may indicate how many work products are associated with each cluster. The summary may also indicate the degree of variability within a cluster. The summary may comprise parts of the centroid relative to the cluster. The summary may comprise a listing of motifs associated with the cluster.

Methods according to embodiments of the invention may be useful for the detection of work product students may have copied from each other. Work products submitted via a computing device may be analyzed for motifs and may be formed in clusters. Similarity between two student works within a cluster may be indicated by the computing device to the teacher. Methods according to embodiments of the invention may be advantageous in that copying may be detected even if students attempt to avoid detection of copying by, for example, changing order of motifs present in student work and/or combining different motifs from a number of other works (and not only from one). Plagiarism may be detected if the similarity between motifs or between work products is above a certain threshold.

EXAMPLE 1

The following example describes how a semi-automatic method for assessment of student work product may be performed, according to embodiments of the invention, with respect to an assignment in the field of computer science. The exemplary assignment that is assigned to the students is, "Receive an input from a user having a number between 1 and 23. Display on the screen an acute triangle having one leg being the length of the input number."

Although the current example refers to a method comprising one question, student work product according to embodiments of the invention may comprise answers to assignments having one question or multiple questions. Motif identification and subsequent clustering may be performed on a per-question basis, or based on an entire work product.

Students electronically submit their answers to the assignment by uploading them to a university's LMS using the internet, after using their unique student identification numbers to enter the student assessment website. Student solutions, each submitted by a different student, are submitted. Exemplary solutions are detailed below.

For each solution, an input loop and an output loop is expected. Ten students submit their solutions as follows. All student solutions (work products) are entered into a computing device which detects motifs. Motifs that do not contribute to the optimal state of maximum coverage and minimum overlap arc removed. Motifs arc identified representing input loops, designated In1, In2 and In3 and output loops, designated 01, 02 and 03 using a sequence alignment algorithm. In addition, alternate motifs not related to input loops or output loops. These motifs are designated X1 and X2. Input loop In3 and output loop 03 are each found only in one work product. No two work products are identical, as each of the input and output loops may be encoded using various syntax to achieve the same input or output loop.

The computing device proceeds, upon identification of motifs in student work product, to cluster student work product into clusters based on the motifs found.

Cluster A represents work products in which there is a correct response for input loop and output loop, as represented by In1 and 01, respectively. Cluster B represents a work product in which there is a correct response for the input loop and a response of 02 for the output loop. Cluster C represents a work product in which there is an incorrect response for the input loop (In2) and a correct response for the output loop. Cluster D represents a work product in which there is an incorrect response for both input loop and the output loop. Cluster L represents the work products in which an additional motif, either X1 or X2 was present. Cluster Q represents a cluster having motifs not present in other work products, in this case, In3 and 03. The student ID numbers, associated motifs and clusters are shown below in Table 1.

TABLE 1

| Student ID | Input Loop Motif | Output Loop Motif | Additional Motif | Cluster |
|---|---|---|---|---|
| 1 | In1 | 01 | X1 | A, L |
| 2 | In1 | 02 |  | B |
| 3 | In2 | 01 |  | C |
| 4 | In2 | 01 |  | C |
| 5 | In1 | None |  | B |
| 6 | In1 | 02 |  | B |
| 7 | In2 | 02 | X2 | L, D |
| 8 | None | 01 |  | C |
| 9 | In1 | 01 |  | A |
| 10 | In1 | 01 |  | A |
| 11 | In1 | 01 |  | A |
| 12 | In1 | 02 | X1, X2 | B, L |
| 13 | In1 | 01 |  | A |
| 14 | In2 | 01 |  | C |
| 15 | None | None | X1 | L, D |
| 16 | In1 | 01 |  | A |
| 17 | In1 | 01 |  | A |
| 18 | In1 | None |  | B |
| 19 | None | 02 |  | D |
| 20 | In3 | 03 |  | Q |

A teacher is then presented with the clustering and is presented with a centroid work product of each cluster. The teacher provides relevant feedback regarding the centroid work product, relevant to each cluster. The feedback provided by the teacher based on the clustering is then provided to each student based on the cluster or clusters to which his or her work product relates.

The teacher may also designate a work product as not relevant to one of the clusters.

Both the clustering data and assessment data are stored in a database. The teacher may provide valuable feedback to 20 students while only actually reviewing seven solutions, thereby saving time of review.

Figure 4:
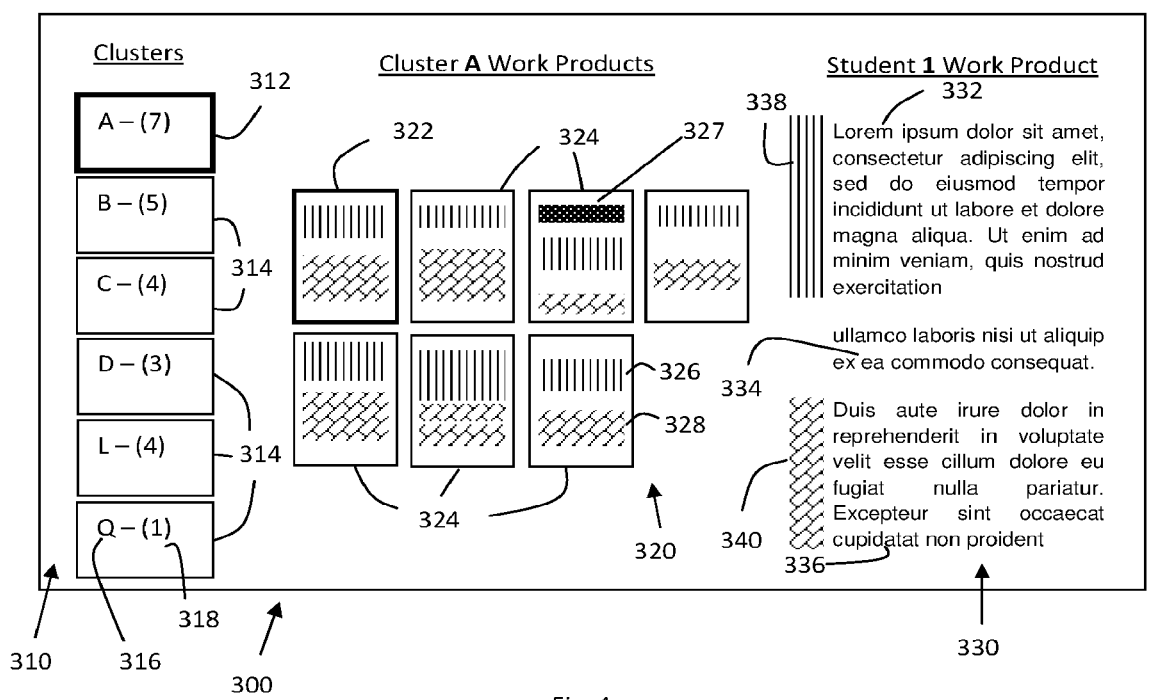
FIG. 4 depicts a wireframe of a display of clustered results according to embodiments of the invention.

The teacher or other user of the computing device may be presented, via a display connected to the computing device, with clustering and associated data as depicted in FIG. 4. FIG. 4 represents a wireframe 300 of a display of clustered results according to embodiments of the invention. Wireframe 300 comprises cluster icons 310, which comprise selected cluster icon 312 and non-selected cluster icons 314. Cluster icons 310 comprise cluster identifier 316 and cluster data 318. Cluster data may comprise data relating to each cluster. In FIG. 4, shown are representations of numbers of student work product in each cluster. Cluster data 318 may comprise summary data summarizing a motif or multiple motifs presented in each cluster. Each cluster icon 310 can be selected to display graphical representations of work products in the cluster designated on the icon.

Wireframe 300 comprises work product graphics 320. Each work product graphic comprises motif designators 326 and 328. Motif designators 326 and 328 each represent a motif present in a work product graphic. In wireframe 300, motif designator 326 represents presence of In1motif in a work product. Motif designator 328 represents presence of 01 motif in a work product. As shown in FIG. 4, all cluster A work products shown graphically by work product graphics 320 comprise both motif designators 326 and 328. The position and length of each motif designator 326 and 328 differs within the work products, as depicted by graphics 320. Certain work products comprise a non-significant motif, as indicated by motif designator 327.

Work product graphics 320 comprise non-centroid graphics 324 and centroid graphic 322. Centroid graphic 322 represents a centroid work product of cluster A. Non-centroid graphics 324 represented work products within cluster A which are not the centroid.

Wireframe 300 further comprises work product display 330, which represents the work product associated with the selected work product graphic, in particular centroid graphic 322. Work product display 330 comprises sections 332, 334 and 336. Sections 332 and 336 are indicated as sections of the work product designated as motifs by motif designators 338 and 340, respectively. Section 334 is not designated by a motif designator, and represents a section of work product not associated with a motif.

A teacher may access wireframe 300 via a computing device connected to a display. The teacher may select one of the cluster icons 310 to view a cluster. The work products associated with the selected cluster may be displayed in graphical form as work product graphics 320. The teacher may then select a work product graphic 320 to view it in work product display 330. The teacher may see which sections of each work product are associated with each motif by seeing the motif designators 338 and 336 associated with each section.

EXAMPLE 2

The following example illustrates how a motif bank may be processed to combine and/or remove insignificant motifs, as addressed with reference to FIG. 2, block 120. In this example, motifs which are significant are then used for clustering, whereas the removed, insignificant motifs are not used for clustering.

In an exemplary use of methods according to embodiments of the invention, 7 student works are received, and are designated Work1-Work7. Table 2 represents a matrix comprising motif data relevant to each of the student works.

TABLE 2

|  | Motif 1 | Motif 2 | Motif 3 | Motif 4 | Motif 5 | Motif 6 | Motif 7 | Motif 8 | Coverage |
|---|---|---|---|---|---|---|---|---|---|
| Chose Work 1 | 1 | 1 | 0 | 0 | 1 | 0 | 1 | 0 |  |
|  |  |  |  |  | 1 |  | 1 | 1 | 1 |
|  |  |  | 1 | 1 | 1 |  |  | 1 | 1 |
|  | 1 |  | 1 | 1 |  |  |  |  | 1 |
|  | 1 |  |  | 1 | 1 |  |  | 1 | 1 |
|  |  |  |  |  | 1 |  |  | 1 | 0 |
| Work 2 |  |  |  |  | 1 |  |  |  | 1 |
|  |  | 1 |  |  | 1 |  |  |  | 2 |
|  |  |  | 1 |  |  | 1 |  |  | 2 |
|  |  |  |  |  |  |  | 1 |  | 1 |

TABLE 2-continued

| | Motif 1 | Motif 2 | Motif 3 | Motif 4 | Motif 5 | Motif 6 | Motif 7 | Motif 8 | Coverage |
|---|---|---|---|---|---|---|---|---|---|
| Work 3 | 1 | | | | | | | | 1 |
| | 1 | | | | | | | 1 | 1 |
| | 1 | | | 1 | | | | | 1 |
| | | 1 | | | 1 | | | 1 | 2 |
| | | 1 | | | 1 | | | | 2 |
| Work 4 | 1 | 1 | 1 | | | | | | 1 |
| | 1 | 1 | 1 | | | | 1 | | 1 |
| | 1 | 1 | | | | | | | 1 |
| Work 5 | | | | | 1 | | | | 1 |
| | | 1 | | | 1 | | 1 | | 1 |
| | | | | | 1 | | 1 | | 1 |
| | | | | | | 1 | | | 1 |
| Work 6 | | | | | 1 | | | | 1 |
| | | 1 | 1 | | | | | | 0 |
| | | | | | | | | | 0 |
| | | | | | | | | | 1 |
| | | | | | | | | | 1 |
| | | | | | | | | | 1 |
| | | | | | | | | | 1 |
| Work 7 | 1 | | | | | | 1 | | 1 |
| | 1 | | | | | | | 1 | 2 |
| | | | | | 1 | | | | 1 |
| | | | | | 1 | | | | 1 |

Each line of the matrix may represent a command, word or sentence of a work. The computing device, via its processor, identifies, initially 8 motifs present in all of the student works, indicated as motifs 1-8, which are stored in the motif bank. The presence of a given motif in a given line of a student work is represented by a number "1". The absence of a given motif in a given line of a student work is represented by a blank space or by a number 0. The presence or absence of the motifs in each work may be calculated using a local sequence alignment technique, indicating that a motif may be present even if there is not 100% similarity in the given set of lines of the work to the motif in the bank.

The column of the matrix labeled "coverage" represents the sum of values in the table for each line, for a set of chosen motifs. In order to limit the number of motifs, the choice of motifs is optimized using an optimization algorithm, to receive a vector having values as close as possible to 1 in the "coverage" column A result of 1 in a given line of the coverage column would represent a motif providing a coverage of the command/word/sentence represented by the line, by one of the chosen motifs. A result of less than 1 indicates that the chosen motifs provide no coverage for a given line of a work. A result of greater than 1 indicates that the chosen motifs provide overlap relative to the given line of work.

An optimization algorithm is employed using the matrix to provide a vector as close as possible to 1 in the coverage column. The optimization algorithm may employ a genetic algorithm. Alternatively, or additionally, the optimization algorithm may employ hill climbing, gradient descent, simulated annealing and/or dynamic programming Optionally, more than one cycle of optimization may be performed for locating appropriate motifs.

In the matrix shown in Table 2, motifs 1, 2, 5 and 7 are chosen motifs. These motifs are then used for clustering of the student works into clusters according to the chosen motifs present in the student works.

There is further provided in accordance with an embodiment of the invention a method for assessment of student work product comprising: receiving, via a computing device, a plurality of student work products from a plurality of students, identifying motifs present in the student work product using a computing device; clustering the work product into clusters using a computing device based on motifs present in the student work product; receiving an assessment from a teacher relevant to clusters; and providing assessment to a student for a student work product based on the assessment of the clusters. Optionally, the motifs are identified using sequence alignment of the received student work product.

Optionally, clustering is performed using a method selected from the group consisting of: Neighbor-Joining, K-Means, Gaussian Mixture Models, Expectation Maximization, Self-Organizing Maps, Principle Component Analysis, Genetic Algorithms and Neural Networks. Optionally, work product is received from more than 50 students. Optionally, work product is clustered into between 5 and 20 clusters. Optionally, after clustering, the work product is displayed using a graphical representation of work product associated with each cluster. Optionally, motifs are displayed graphically within each graphical representation of work product. Optionally, the method comprises receiving input, after clustering, from a teacher relevant to association of a work product with a cluster. Optionally, the method further comprises re-clustering work products based on teacher input relevant to association of a work product with a cluster. Optionally, identifying motifs present in the student work product comprises using motif data previously received based on previously received student work product. Optionally, the assessment comprises one or a plurality of: a grade of the work product, feedback regarding the student work product, a suggestion of a future assignment for the author of the student work product and/or a suggestion of directed study. Optionally, the method further comprises, after identifying motifs, identifying a subset of motifs which provides enhanced coverage of student work product. Optionally, the method further comprises, after identifying motifs, identifying a subset of motifs which provides minimal overlap of student work product. Optionally, the method further comprises, after identifying motifs, removing insignificant motifs using an optimization algorithm. Optionally, optimization algorithm is selected from the group consisting of: a genetic algorithm, hill climbing, gradient descent, simulated annealing and dynamic programming Optionally, the optimization algorithm indicates which subset of motifs provide maximum coverage of the collective works with a minimum overlap. Optionally, clustering is performed based on the subset of motifs. Optionally, the method further comprises, upon clustering, identifying a centroid associated with each cluster. Optionally, the method further comprises, displaying the centroid associated with a cluster to the teacher. Optionally, the method further comprises, upon clustering, displaying summary data relevant to motifs, clusters and/or student work product. Optionally, the summary data comprises statistical data. Optionally, the method further comprises, upon clustering, storing clustering data on a database. Optionally, the method further comprises, upon providing assessment to a student, receiving further input on the assessment from student. Optionally, a motif is identified through feature-based motif identification. Optionally, a motif is identified through a reference matching algorithm. Optionally, receiving a plurality of student work products is performed a Learning Management System. Optionally, the method further comprises, receiving a plurality of student work products is performed a web-based platform. Optionally, the student work product is selected from the group consisting of: answers to assignments, reports, projects, homework answers and test answers.

There is further provided in accordance with an embodiment of the invention method for assessment of a response to a question comprising: receiving, via a computing device, a plurality of responses from a plurality of responders, identifying motifs present in the responses using a computing device; clustering the responses into clusters using a computing device based on motifs present in the responses; providing a description of the clustered responses.

In the description and claims of the present application, each of the verbs, "comprise," "include" and "have," and conjugates thereof, are used to indicate that the object or objects of the verb are not necessarily a complete listing of components, elements or parts of the subject or subjects of the verb.

Descriptions of embodiments of the invention in the present application are provided by way of example and are not intended to limit the scope of the invention. The described embodiments comprise different features, not all of which are required in all embodiments of the invention. Some embodiments utilize only some of the features or possible combinations of the features. Variations of embodiments of the invention that are described, and embodiments of the invention comprising different combinations of features noted in the described embodiments, will occur to persons of the art. The scope of the invention is limited only by the claims.

The invention claimed is:

1. A method for assessment of student work product comprising:
   receiving, via a computing device, a plurality of student work products from a plurality of students;
   identifying motifs present in the student work product using a computing device;
   generating, by the computing device, a motif bank based on the motifs present in the student work products;
   processing, by the computing device, the motif bank using a sequence alignment algorithm to provide an optimum of maximum coverage with minimum overlap of student work products based on motifs;
   clustering the work product into clusters using a computing device based on motifs present in the student work product;
   receiving an assessment from a teacher, the assessment based on the clusters; and
   generating a student assessment for at least one of the plurality of student work products, the student assessment based on the assessment of the clusters.

2. The method of claim 1 further comprising generating a centroid work product for each of the plurality of clusters and work products associated with each of the plurality of clusters.

3. The method of claim 2 further comprising presenting the centroid work product to the teacher.

4. The method according to claim 1 wherein clustering is performed using a method selected from the group consisting of: Neighbor-Joining, K-Means, Gaussian Mixture Models, Expectation Maximization, Self-Organizing Maps, Principle Component Analysis, Genetic Algorithms and Neural Networks.

5. The method according to claim 1, wherein after clustering, the work product is displayed using a graphical representation of work product associated with each cluster.

6. The method according to claim 5 wherein motifs are displayed graphically within each graphical representation of work product.

7. The method according to claim 1 further comprising receiving input, after clustering, from a teacher relevant to association of a work product with a cluster.

8. The method according to claim 7 further comprising re-clustering work products based on teacher input relevant to association of a work product with a cluster.

9. The method according to claim 1 wherein identifying motifs present in the student work product comprises using motif data previously received based on previously received student work product.

10. The method according to claim 1, wherein the assessment comprises one or a plurality of: a grade of the work product, feedback regarding the student work product, a suggestion of a future assignment for an author of the student work product and/or a suggestion of directed study.

11. The method according to claim 1 further comprising, after identifying motifs, identifying a subset of motifs which provides enhanced coverage of student work product.

12. The method according to claim 10 further comprising, after identifying motifs, identifying a subset of motifs which provides minimal overlap of student work product.

13. The method according to claim 1 further comprising, after identifying motifs, removing insignificant motifs using an optimization algorithm.

14. The method according to claim 13, wherein the optimization algorithm is selected from the group consisting of: a genetic algorithm, hill climbing, gradient descent, simulated annealing and dynamic programming.

15. The method according to claim 13 wherein the optimization algorithm indicates which subset of motifs provide maximum coverage of a collective work with a minimum overlap.

16. The method according to claim 15 wherein clustering is performed based on the subset of motifs.

17. The method according to claim 1 wherein a motif is identified through feature-based motif identification.

18. The method according to claim 1 wherein a motif is identified through a reference-matching algorithm.

19. A method for assessment of a response to a question comprising:
   receiving, via a computing device, a plurality of responses from a plurality of responders;
   identifying by a computing device motifs present in the responses;

generating, by the computing device, a motif bank based on the motifs present in the responses;

processing, by the computing device, the motif bank using a sequence alignment algorithm to provide an optimum of maximum coverage with minimum overlap of responses based on motifs;

clustering, by the computing device, the responses into one of a plurality of clusters based on the motifs present in the responses;

receiving an assessment based on the clusters; and generating a responder assessment for at least one of the plurality of responses, the responder assessment based on the assessment of the clusters.

20. A system for assessing a work-product, the system comprising:

one or more processors;

a memory communicably coupled to the one or more processors and storing:

an assessment system including instructions that when executed by the one or more processors cause the one or more processors to generate a responder assessment by:

receiving a plurality of responses from a plurality of responders;

identifying motifs present in the responses;

generating a motif bank based on the motifs present in the responses;

processing the motif bank using a sequence alignment algorithm to provide an optimum of maximum coverage with minimum overlap of responses based on motifs;

clustering the responses into one of a plurality of clusters based on the motifs present in the responses;

receiving an assessment based on the clusters; and generating the responder assessment for at least one of the plurality of responses, the responder assessment based on the assessment of the clusters.

* * * * *